Sept. 19, 1950 R. L. MAYRATH 2,522,835
BRAKE-HOLDING DEVICE
Filed Nov. 15, 1947

INVENTOR.
Robert L. Mayrath.
BY
Harness and Harris
ATTORNEYS.

Patented Sept. 19, 1950

2,522,835

UNITED STATES PATENT OFFICE 2,522,835

BRAKE HOLDING DEVICE

Robert L. Mayrath, Berkley, Mich., assignor to Chrysler Corporation, Highland Park, Mich., a corporation of Delaware Application November 15, 1947, Serial No. 786,277

11 Claims. (Cl. 192—3)

This invention relates to a brake control device particularly adapted for use as a no-creep device for motor vehicles having a fluid power transmitting unit and a fluid pressure actuated brake system, the device being completely automatic in its method of operation.

The invention relates particularly to a device which will automatically hold the brakes applied, under certain conditions, the holding device being conjointly controlled by two control units, one being a pressure operated switch which is responsive to vehicle and engine speed and the other being a micromatic switch which is responsive to movement of the foot accelerator. This brake holding device is so constructed that the brakes will be held applied only when both of the aforementioned control units are in a predetermined condition.

It is one of the objects of my invention to provide a simple, satisfactory, no-creep device which will prevent a motor vehicle equipped with a fluid coupling or a fluid power transmission unit from moving forward after the vehicle has been brought to a stop with the engine running and the transmission in gear.

It is a further object of the present invention to provide a brake control device which will hold the vehicle service brakes in an applied position after release of the brake pedal by the vehicle driver, provided the vehicle had been brought to a stop or the vehicle speed reduced to a predetermined negligible amount preliminary to coming to a stop.

It is a further object of this invention to provide a brake holding device which automatically sets the brakes when bringing the vehicle to a stop and automatically releases the brakes when the vehicle driver initiates action to set the car in motion, the brake setting and releasing action being so smooth that the vehicle driver is unawares of the action of the brake holding device.

A further object of this invention is to provide an automatically operative no-creep device which will also function as an anti-roll back or hill-holding device.

It is a further object of this invention to provide an automatically operable brake holding device which may be easily connected to the standard fluid pressure operated braking system of a motor vehicle without necessitating any major changes or alterations in the system. This device is such that it may be supplied as an accessory for, or as an integral part of, the standard fluid pressure braking system now furnished on most motor vehicles.

It is a further object of this invention to provide an automatically operable brake holding device which makes vehicle driving more pleasant and less tiring due to the fact that the vehicle driver is not required to hold the brakes applied to prevent movement of the vehicle after the vehicle has once been brought to a stop. In vehicles equipped with a fluid coupling or a fluid power transmission unit or some form of slip-drive power transmitting device this point is of particular significance in that the vehicle may be brought to a stop, left in gear with the engine running and the vehicle will not move from its stopped position even though the vehicle driver releases the brake foot pedal. When it is desired to again set the vehicle in motion the vehicle driver need only depress the foot accelerator and the brake holding device will be automatically released and the vehicle will smoothly move forward without so-called "freight train" jerkiness.

Another object of this invention is to provide an automatically operable brake holding device having the advantages pointed out above but which is so constructed that it will in no way interfere with the use of the service brakes to retard movement of the vehicle when the vehicle is moving above a predetermined minimum speed.

Another object of this invention is to provide a simple, efficient control valve unit which may be connected to the master cylinder of a fluid pressure operated breaking system so as to provide a no-creep device.

Other objects and advantages of my invention will become apparent from the following description taken in connection with the accompanying drawings, in which.

Figure 1:
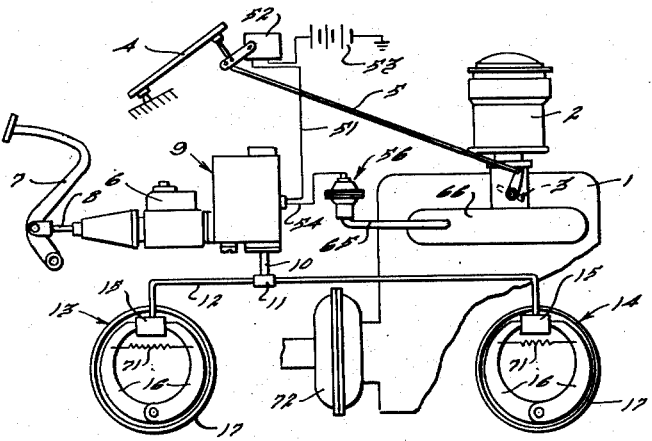
Fig. 1 is a schematic view of a fluid pressure operated braking system and other parts of a motor vehicle having associated therewith my improved brake holding device.

Referring to the drawings in detail, 1 indicates a vehicle engine having the usual carburetor 2 controlled by a throttle valve 3 for varying the amount of fuel fed to the engine The valve 3 is actuated by an accelerator pedal 4 pivotally mounted in the vehicle driver's compartment and connected to the valve 3 by a linkage rod 5. The engine drives the wheels of the vehicle through the usual change speed gearing, clutch and/or fluid coupling, propeller shaft and differential gearing, as is well known in the art. A fluid coupling 72 has been indicated schematically in Fig. 1.

The braking system of the vehicle is schematically shown in Fig. 1, and comprises a brake master cylinder 6, the piston (not shown) of which is actuated by the brake pedal 7 through a piston rod 8, said pedal 7 being mounted in the vehicle driver's compartment. Fitted to the outlet end of the brake master cylinder 6 is the solenoid operated control valve unit 9 of the brake holding device constituting this invention. A fluid pressure conduit 10 connects the outlet end of the valve unit 9 to the fitting 11 from which supply conduits 12 branch out to supply fluid under pressure to the wheel brake units 13 and 14 (only two of which are shown). Each of these wheel brake units comprises an actuating fluid motor or wheel cylinder 15 for the brake shoes 16 whereby the shoes may be moved into braking engagement with a brake drum 17 secured to a vehicle wheel (not shown).

The brake holding valve unit 9, interposed between the brake master cylinder 6 and supply conduit 10, provides means whereby brake fluid under pressure can be trapped in the wheel cylinders 15 of the wheel braking units to thus maintain the wheel brakes applied after braking pressure has been removed from the brake pedal and the pedal has returned to its released position.

Figure 2:
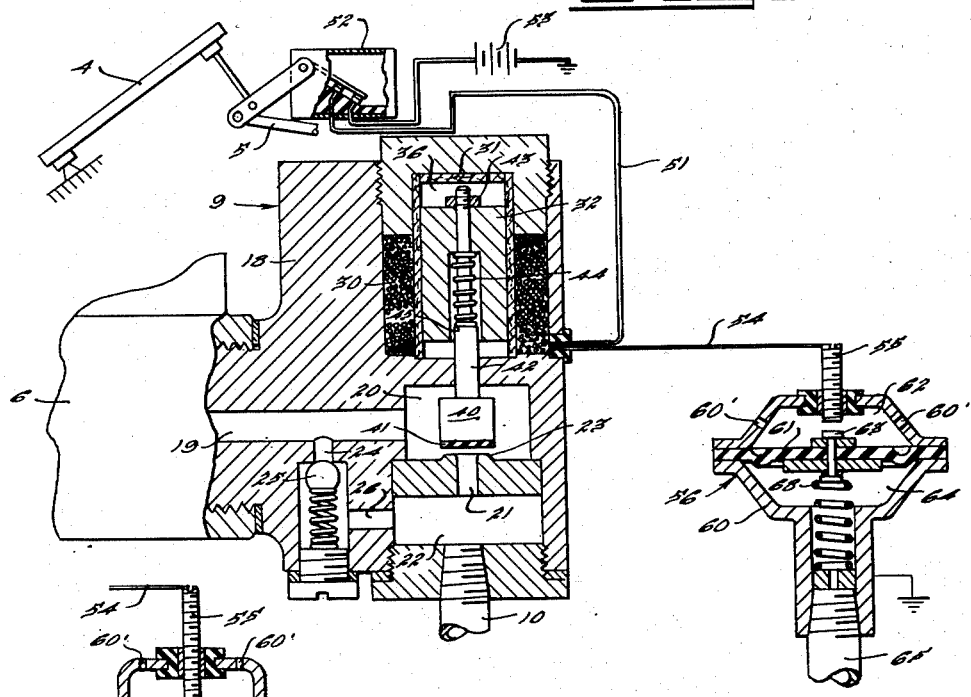
Fig. 2 is an enlarged, fragmentary, side elevational view, partly in section, of certain of the elements of the brake holding device constituting this invention.

As shown in detail in Fig. 2, the brake holding valve unit 9 is connected to the outlet of the master cylinder 6 and comprises a casing 18 having a brake fluid inlet passage 19 connected to a chamber 20. A valve port 21 connects chamber 20 to a chamber 22. Valve port 21 has a raised lip portion 23 constituting a valve seat adapted to cooperate with the solenoid actuated, spring-loaded, control valve 40. Chamber 22 is connected to the wheel braking units by means of the conduits 10 and 12. A by-pass channel 24, controlled by the spring pressed, one-way, ball-type, check valve 25, provides means to connect inlet passage 19 with chamber 22 through passageway 26 when valve 40 is closed. Mounted in a recess in the valve casing 18 is a solenoid coil 30. Solenoid coil 30 surrounds a cup-shaped sleeve member 31 in which plunger member 32 is adapted to reciprocate. Plunger 32 is magnetically responsive to energization of the coil 30 and is adapted to be moved towards the lower end of the plunger bore 36 when coil 30 is energized. The plate-type control valve 40, having a face 41 of resilient material, is mounted in the chamber 20 and connected to plunger 32 so that plunger 32 may move valve face 41 against valve seat 23 when coil 30 is energized. Control valve 40 has a stem portion 42 which projects into the plunger bore 36 and is connected to valve plunger 32. The projecting end of valve stem 42 is reduced in diameter and threads through the plunger 32. The reduced end portion of stem 42 is connected to the plunger 32 by means of a nut 43 threaded on the reduced outer end of the stem 42. A compression spring 44 is mounted on the reduced portion of valve stem 42, between the plunger 32 and the shoulder 45 formed by the enlarged portion of the valve stem 42. By the use of a compression spring between the plunger 32 and the enlarged portion of the valve stem 42, a spring-loaded pressure relief valve is formed in the solenoid operated control valve 40. When the solenoid coil 30 is energized and the plunger 32 moved towards the valve seat 23, the valve facing 41 is resiliently held against the valve seat 23. In the event the pressure trapped in the brake lines when valve 40 is closed is greater than that exerted by the plunger 32 pressing the spring 44 against the enlarged portion of valve stem 42, then the valve 40 will be backed off the seat 23 and will function as a pressure relief valve until the pressure in the brake lines has been reduced to the pressure exerted by the plunger pressed spring 44. This particular construction permits variation in the amount of line pressure to be retained in the wheel braking units after the control valve 40 has been moved to closed position. By changing the force value of the compression spring 44, the braking pressure to be trapped in the brake lines may be varied. It has been found that approximately 120 pounds per sq. in. pressure in the brake lines is adequate to prevent creep of a motor vehicle equipped with a fluid coupling or a fluid transmission yet such a trapped braking pressure is not enough to produce an objectionable deceleration when the vehicle is brought to a stop. A trapped braking pressure of 120 pounds will also release rapidly enough in starting up to prevent a "freight train" start. The connection of the solenoid plunger 32 to the valve stem 42 through a compression spring not only provides a relief valve but it also permits the use of a smaller solenoid coil and reduces the load on the resilient valve facing 41 so as to give a more satisfactory device at a reduced cost.

The ball-type by-pass valve 25 provides means which permits the increasing of the trapped brake line pressure after the valve 40 has been closed due to energization of the solenoid coil 30.

The circuit for controlling the solenoid 30 is shown in Fig. 1. One end of the solenoid coil 30 is connected by a conductor 51 to a micromatic switch 52 controlled by movement of the foot accelerator 4. The foot accelerator switch 52 is such that this switch is closed only when the accelerator pedal is in released, closed throttle position. At all other accelerator positions the accelerator switch 52 is open and therefore the solenoid 30 cannot be energized whenever the foot accelerator is depressed from throttle closed position. The accelerator switch 52 is connected to ground through a source of electrical energy such as the storage battery 53. The other end of the solenoid coil 30 is connected by conductor 54 to one contact 55 of vacuum operated governor switch 56. The vacuum operated or differential pressure operated governor switch 56 comprises a two-piece, metallic casing 60 having a flexible, resilient diaphragm 61 interposed between the sections of the casing. The chamber 62 on one side of the diaphragm 61 is connected to the atmosphere through ports 60'. The chamber 64 on the other side of the diaphragm 61 is connected by means of tube 65 to the intake manifold 66 of the engine 1. The diaphragm 61 of the vacuum switch 56 mounts a switch contact 63 adapted to engage the contact 55 when the vacuum in the chamber 64 on the intake side of the diaphragm has been reduced to such a degree, that the spring 68 can urge the diaphragm contact 63 outwardly. Spring 68 is of conductive material and has one end connected to the diaphragm contact 63 while the other end bears against the base section of metallic casing 60. When contacts 55 and 63 are closed vacuum switch 56 provides a lead to ground through the spring 68 and casing 60.

The brake holding device constituting this invention makes use of the fact that when a motor vehicle equipped with a fluid coupling is stopped, or nearly stopped, and left in gear with the clutch engaged and the throttle closed then the intake manifold vacuum is approximately three inches of mercury less than when the transmission is in neutral with the engine idling. This difference in vacuum being due to the drag of the coupling runner and other connected elements being driven by the coupling runner as a result of the transmission being in gear. Obviously at all open throttle engine speeds the throttle switch 52 is open and the solenoid 30 is deenergized so valve 40 is open and the brake holding device is inoperative. At engine speeds above the speed of free idle of the engine the electrical circuit for the solenoid 30 is also broken due to the contacts of the vacuum operated switch 56 being open, even if the throttle switch 52 is closed. As the engine speed drops below the speed of free engine idle, the manifold vacuum also drops and the vacuum switch contacts are then closed. As the throttle is also closed at this time the throttle switch 52 will be made and the circuit for the solenoid 30 completed. Thus, it will be seen that vacuum operated switch 56 is such that when the engine speed has been reduced to a speed less than that of free engine idle then the vacuum on the intake side of the diaphragm 61 will have been reduced to such a degree that spring 68 will close the diaphragm switch and connect contact 55 to ground. It is obvious from a consideration of the series circuit herein described that the foot accelerator switch 52 and the diaphragm operated vacuum switch 56 must both be closed in order to permit energization of the solenoid 30 to close valve 40. The accelerator switch will be closed only when the throttle is closed whereas the vacuum switch will be closed only when the vehicle speed has been reduced to such a point that the engine speed is below the speed of free engine idle. The two control switches will be closed at the same time only when the vehicle has been brought to a stop and left in gear with the throttle valve closed or when the vehicle speed has been reduced to less than 3 or 4 miles per hour with the throttle valve closed. When the above two conditions exist, then the brake holding valve 40 will be automatically closed and the pressure trapped in the brake lines will be only as high as the highest brake pressure applied after the valve 40 has closed and in no case will the pressure trapped in the brake lines exceed the limiting pressure of the solenoid relief valve which is controlled by the compressed spring 44. As previously mentioned a spring applied pressure of approximately 120 pounds per square inch has been found most satisfactory for motor vehicles on which this device has been installed.

The no-creep device herein disclosed functions as follows: When the vehicle is traveling above the speed of free engine idle, the vacuum switch 56 is open and regardless of the condition of the accelerator switch 52 the circuit through the solenoid 30 is broken and the brake system functions in the normal manner due to solenoid control valve 40 being open. Under such conditions the valve 40 is raised off the valve seat 23 by the brake shoe springs 71 when the shoes 16 are returned to released position. When the speed of the vehicle drops below 4 miles per hour the contacts of the vacuum switch 56 will close but the solenoid 30 will not be energized unless at the same time that these vacuum switch contacts are closed the throttle valve is also closed. With the throttle valve closed and the vacuum switch contacts closed the solenoid coil 30 will become energized and control valve 40 will close and trap brake fluid in the brake lines and hold the brakes applied with a pressure of not exceeding approximately 120 pounds per square inch. This pressure in the brake lines is such as to to prevent creep of the vehicle in the event the vehicle is left in gear while stopped. When it is desired to accelerate the vehicle the driver need only depress the accelerator pedal and this will automatically open the accelerator switch and simultaneously deenergize the solenoid 30 and open the control valve 40. The opening of the valve 40 releases the trapped fluid in the brake lines and the vehicle can then be accelerated as the accelerator pedal is further depressed. It is obvious that if the throttle is closed and the vehicle speed drifts down below 4 miles per hour so as to close the vacuum switch contacts 55, 63 that still the brakes will not be set unless the brake pedal is depressed to stop the vehicle or slow it down for there will be insufficient pressure in the brake lines to move the brake shoes against the brake drums. Consequently, a vehicle may coast at a very slow speed without having the brakes applied and immediately upon depression of the foot accelerator the vehicle can be accelerated without any intereference from the no-creep device. As the brakes are held applied when the vehicle is brought to a stop it is obvious how this device functions as a hill holding device as well as a no-creep device.

Figure 3:
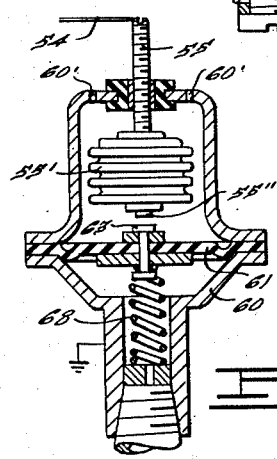
Fig. 3 is a sectional elevational view of a modified form of vacuum switch governor control intended for use with this brake holding device.

Fig. 3 is a modification of the vacuum switch shown in Fig. 2. This modified form of vacuum switch is designed to take into account and compensate for differences in manifold vacuum which may occur due to the vehicle operating at various altitudes. The modified form of switch shown in Fig. 3 differs from the form of vacuum switch shown in Fig. 2 only in that the fixed contact 55 mounts a sealed, evacuated bellows device 55' which automatically corrects for the differences in manifold vacuum due to differences in atmospheric pressure. This correction is provided by the bellows 55' expanding and contracting with changes in atmospheric pressure so as to keep the gap between the contact 55" and the movable diaphram contact 63 at free engine idle substantially constant at all altitudes. The fixed contact 55, in both the forms shown in Figs. 2 and 3, is threaded into the vacuum switch casing 60 and this feature permits adjustment of the gap between the vacuum switch contacts.

While the several control units herein disclosed have been illustrated in connection with a no-creep brake holding device, it is obvious that either or both of these control units may be used with any form of fluid power transmission unit to control various mechanisms associated therewith so as to provide means for accomplishing automatic operation of such various mechanisms as clutch shifts, transmission upshifts and downshifts and many other normally manually operated control devices.

I claim:

1. In an engine driven vehicle provided with a fluid power transmitting device, a system of fluid pressure operated brakes, a foot accelerator, an engine intake manifold and a source of electrical energy; manually operated means for applying said brakes, an electro-magnetically operated, normally open, valve adapted to be closed to hold said brakes applied, and manifold vacuum operated switch means and accelerator operated switch means connected in series and adapted to be closed to cooperatively effect closure of said valve, said manifold vacuum operated switch means being adapted to be closed only when said accelerator operated switch means is closed and the fluid power transmitting device is arranged for the transmission of power.

2. In a fluid pressure operated braking system for an engine-driven vehicle having a fluid power transmitting unit adapted to be drivingly connected between the engine and a driven member, an intake manifold, an accelerator and a source of electrical energy, a master brake cylinder and wheel brake cylinders adapted to receive pressure fluid from said master cylinder to apply the wheel brakes, the combination of a normally open, electro-magnetically operated, control valve interposed between said master cylinder and said wheel cylinders and adapted to be closed to maintain fluid pressure in said wheel cylinders to hold said wheel brakes applied, and intake manifold vacuum operated switch means and accelerator operated switch means arranged in series for conjointly controlling operation of said control valve, simultaneous closure of both of said switch means effecting closure of said valve, said vacuum operated switch means being closed only when said fluid power transmitting means is drivingly connected between said engine and said driven member and said accelerator is in closed throttle position whereby a predetermined differential in manifold vacuum exists over that when the fluid power transmitting unit is disconnected from said driven member, said differential effecting closure of said vacuum operated switch means.

3. A fluid pressure operated braking system as set forth in claim 2 including a by-pass valve between said master cylinder and said wheel cylinders adapted to permit the increasing of the braking pressure in said wheel cylinders when said control valve is closed.

4. In an engine driven vehicle equipped with a fluid coupling adapted to be drivingly connected between the engine and a driven member, an engine controlled vacuum source, an accelerator and a system of fluid pressure operated brakes, an electrically operated control valve for said brake system adapted to trap pressure fluid in the brake system, and vacuum controlled switch means and accelerator controlled switch means arranged in series for conjointly controlling said valve said vacuum controlled switch effecting operation of said control valve to trap pressure fluid in said brake system when said accelerator is in closed throttled position and said fluid coupling is drivingly connected between the engine and the driven member.

5. In a motor vehicle provided with an engine driven fluid power transmitting device, a system of fluid pressure operated brakes, an engine accelerator control and an engine intake manifold; manually operable means for applying said brakes, an electrically operated, normally open, valve associated with said brake system adapted to be closed to trap pressurized fluid in said brake system to thereby hold said brakes in an applied position, and an electrical circuit for controlling operation of said electrically operated valve comprising a manifold pressure operated switch means and an accelerator controlled switch means arranged in series and adapted to be closed simultaneously to cooperatively effect closure of said valve, said manifold pressure operated switch means being connected to said engine intake manifold at such a location that it is closable by manifold pressure only when said accelerator controlled switch means is closed and when the fluid power transmitting device is arranged for the transmission of power.

6. The combination set forth in claim 5 wherein the electrically operated valve includes means whereby the pressure trapped in the brake system by closure of said valve may be increased to a predetermined value by actuation of manually operable means.

7. In a motor vehicle provided with an engine driven fluid power transmitting device, a system of fluid pressure operated brakes, an engine intake manifold, a throttle valve in said intake manifold, an accelerator for operating said throttle valve between open and closed throttle positions, manually operable means for applying said brakes, an electrically operated, normally open, valve associated with said brake system adapted to be closed to trap pressurized fluid in said brake system to thereby hold said brakes in an applied position, and an electrical circuit for controlling operation of said electrically operated valve comprising a manifold pressure operated switch means and an accelerator controlled switch means arranged in series and adapted to be closed simultaneously to cooperatively effect closure of said valve, said manifold pressure operated switch means being connected by pressure conduit means to said intake manifold at a point on the engine side of said throttle valve and arranged such that said manifold pressure operated switch is closable by manifold pressure only when said throttle valve is in closed throttle position and when the fluid power transmitting device is arranged for the transmission of power, the latter condition being such as to vary the intake manifold pressure from that existing when the fluid power transmission device is not arranged for the transmission of power, the variation in manifold pressure at closed throttle being effective to close the manifold pressure operated switch.

8. The combination set forth in claim 7 wherein the electrically operated valve includes means whereby the pressure trapped in the brake system by closure of said valve may be increased to a predetermined value by actuation of manually operable means.

9. The combination with an automotive propelling engine, having an intake manifold and an accelerator operated throttle valve for controlling the intake manifold pressure and the engine speed, of a fluid power transmitting unit adapted to be drivingly connected between said engine and a driven member, a system of fluid pressure operated brakes comprising a master cylinder, a wheel brake cylinder, a fluid pressure conduit connecting said cylinders and pedal operated means for applying said brakes, of a normally open, electrically operated, valve connected in the conduit line connecting said cylinders adapted to be closed to render inoperative the pedal operated means to release said brakes and to simultaneously hold said brakes applied, and an electrical control circuit for operating said valve comprising intake manifold pressure operated switch means and accelerator operated switch means arranged in series and adapted to conjointly and automatically control operation of said valve, said manifold pressure operated switch being arranged such that variation in manifold pressure at closed throttle between load and no-load conditioning of the fluid power transmitting unit will effect closure of the valve, said valve being closed only when said accelerator is in a closed throttle position and the fluid power transmitting unit is loaded by a drive transmitting connection between said engine and said driven member.

10. In an automotive vehicle having an engine, an intake manifold therefor, an accelerator operated throttle valve in said intake manifold, a fluid power transmitting device adapted to be drivingly connected between said engine and a driven member, a brake system including wheel brakes, a brake pedal, and apparatus operable by said brake pedal for applying said brakes, electrically operated means for maintaining said brakes applied after said brake pedal has returned to released position, an electrical control circuit for said electrically operated means comprising a first switch operated by said accelerator pedal for in part controlling said electrically operated means, and a second intake manifold pressure operated switch arranged in series with said first switch for in part controlling said electrically operated means, said accelerator pedal operated switch and said manifold pressure operated switch cooperating to automatically retain said wheel brakes in applied position when said vehicle is brought to a stop with the accelerator pedal released to closed throttle position and the fluid power transmitting device drivingly connected to the driven member, the variation in manifold pressure at closed throttle between the loaded and no-load condition of the fluid power transmitting device being effective to cause said switches to energize said electrically operated means to maintain said brakes applied.

11. In an automotive vehicle having an engine, an intake manifold therefore, an accelerator operated throttle valve in said intake manifold, a fluid power transmitting device adapted to be drivingly connected between said engine and a driven member, a brake system including wheel brakes, a brake pedal, and apparatus operable by said brake pedal for applying said brakes, electrically operated means for maintaining said brakes applied after said brake pedal has returned to released position, an electrical control circuit for said electrically operated means comprising a first switch operated by said accelerator pedal for in part controlling said electrically operated means, and a second intake manifold pressure operated switch arranged in series with said first switch for in part controlling said electrically operated means, said accelerator pedal operated switch and said manifold pressure operated switch cooperating to automatically retain said wheel brakes in applied position when said vehicle is brought to a stop with the accelerator pedal released to closed throttle position and the fluid power transmitting device drivingly connected to the driven member.

ROBERT L. MAYRATH.

REFERENCES CITED

The following references are of record in the file of this patent:

UNITED STATES PATENTS

| Number | Name | Date |
|---|---|---|
| 1,724,568 | Durning | Aug. 13, 1929 |
| 2,075,305 | Sayre | Mar. 30, 1937 |
| 2,169,088 | Carter | Aug. 8, 1939 |
| 2,189,403 | Phillips | Feb. 6, 1940 |
| 2,272,320 | Freeman | Feb. 10, 1942 |
| 2,277,584 | Freeman | Mar. 24, 1942 |
| 2,287,562 | Pennington | June 23, 1942 |
| 2,296,132 | Wiseley | Sept. 15, 1942 |
| 2,297,076 | Sacks | Sept. 29, 1942 |
| 2,313,430 | Goepfrich | Mar. 9, 1943 |
| 2,329,156 | Coffey | Sept. 7, 1943 |
| 2,334,611 | Darling | Nov. 16, 1943 |
| 2,414,409 | Goepfrich | Jan. 14, 1947 |
| Re. 20,733 | Barrett | May 24, 1938 |